United States Patent [19]

Valls

[11] Patent Number: 5,120,153

[45] Date of Patent: Jun. 9, 1992

[54] FITTING SOCKET WITH INTEGRAL REINFORCING RING

[75] Inventor: Jose E. Valls, Ponce, P.R.

[73] Assignee: Vassallo Research and Development Corp., Ponce, P.R.

[21] Appl. No.: 627,614

[22] Filed: Dec. 11, 1990

Related U.S. Application Data

[63] Continuation of Ser. No. 268,223, Nov. 7, 1988, abandoned.

[51] Int. Cl.$^5$ .......................... F16B 7/04; F16L 21/02
[52] U.S. Cl. ..................... 403/305; 403/361; 403/375; 285/231; 285/235; 285/345
[58] Field of Search ............... 285/235, 369, 417, 237, 285/230, 231, 345, 374; 403/223, 305, 361, 375

[56] References Cited

U.S. PATENT DOCUMENTS

| 3,430,989 | 3/1969 | Wendt | 285/230 X |
|---|---|---|---|
| 3,544,119 | 12/1970 | Glover | 285/345 X |
| 3,592,491 | 7/1971 | Glover | 285/235 X |
| 3,610,288 | 10/1971 | Carr | 285/417 X |
| 3,682,503 | 8/1972 | Bloom | 285/369 X |
| 3,751,082 | 8/1973 | Somerville | 403/305 X |
| 3,938,834 | 2/1976 | Oostenbrink | 285/235 |
| 4,034,994 | 7/1977 | Ohta et al. | 285/345 X |
| 4,116,474 | 9/1978 | Wolf | 285/235 X |
| 4,174,859 | 11/1979 | Houghton | 285/345 X |
| 4,229,028 | 10/1980 | Gray | 285/235 |
| 4,275,909 | 6/1981 | Yoshizawa et al. | 285/231 X |
| 4,343,480 | 8/1982 | Vassallo | 285/110 X |
| 4,362,187 | 12/1982 | Harris et al. | 285/345 X |
| 4,685,704 | 8/1987 | Kolar | 285/235 X |
| 4,702,502 | 10/1987 | Shade et al. | 285/369 X |
| 4,711,473 | 12/1987 | Glover | 285/235 |
| 4,834,428 | 5/1989 | Pritchatt | 285/369 X |

Primary Examiner—Peter M. Cuomo
Attorney, Agent, or Firm—J. Rodman Steele, Jr.

[57] ABSTRACT

A pipe bell or fitting socket is disclosed which includes an enlarged socket defining an interior, gasket receiving pocket. The enlarged socket terminates endwardly in a front socket terminus and interiorly in an interior terminus. An integral, outwardly extending, reinforcing ring projects radially outwardly from the outer periphery of the socket and provides increased body for socket strengthening purposes. The reinforcing ring may be medially positioned on the socket, may be endwardly positioned on the socket or may be otherwise positioned as best suited for the purposes of use. The reinforcing ring may be of any desired cross-sectional configuration, for example, square, triangular, rectangular or other cross-section.

13 Claims, 3 Drawing Sheets

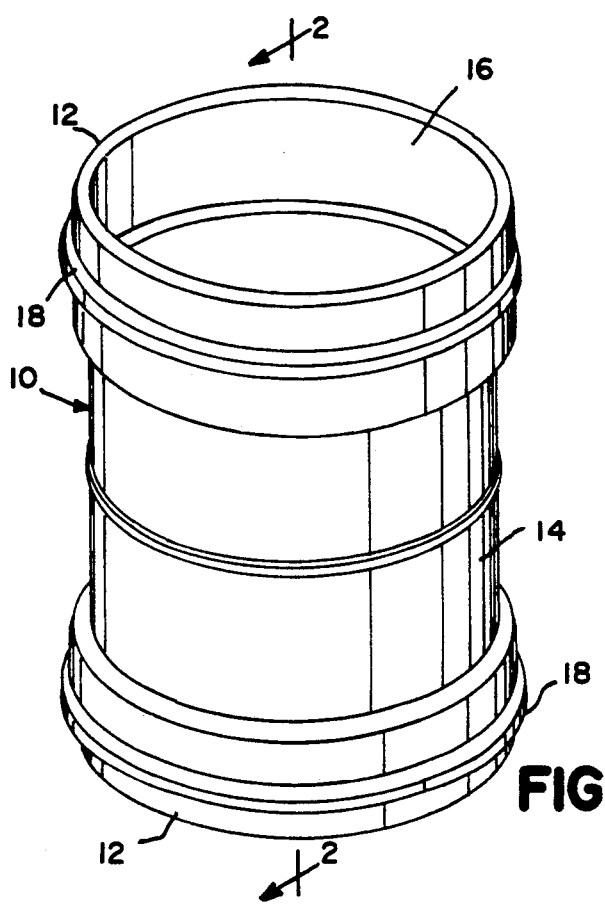
FIG. 1
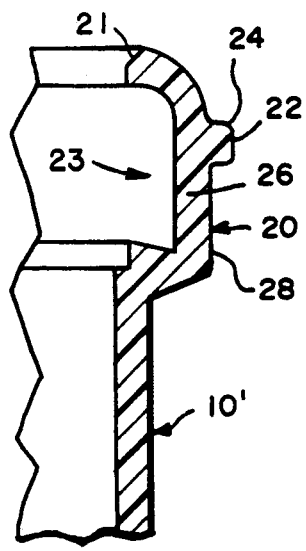
FIG. 3
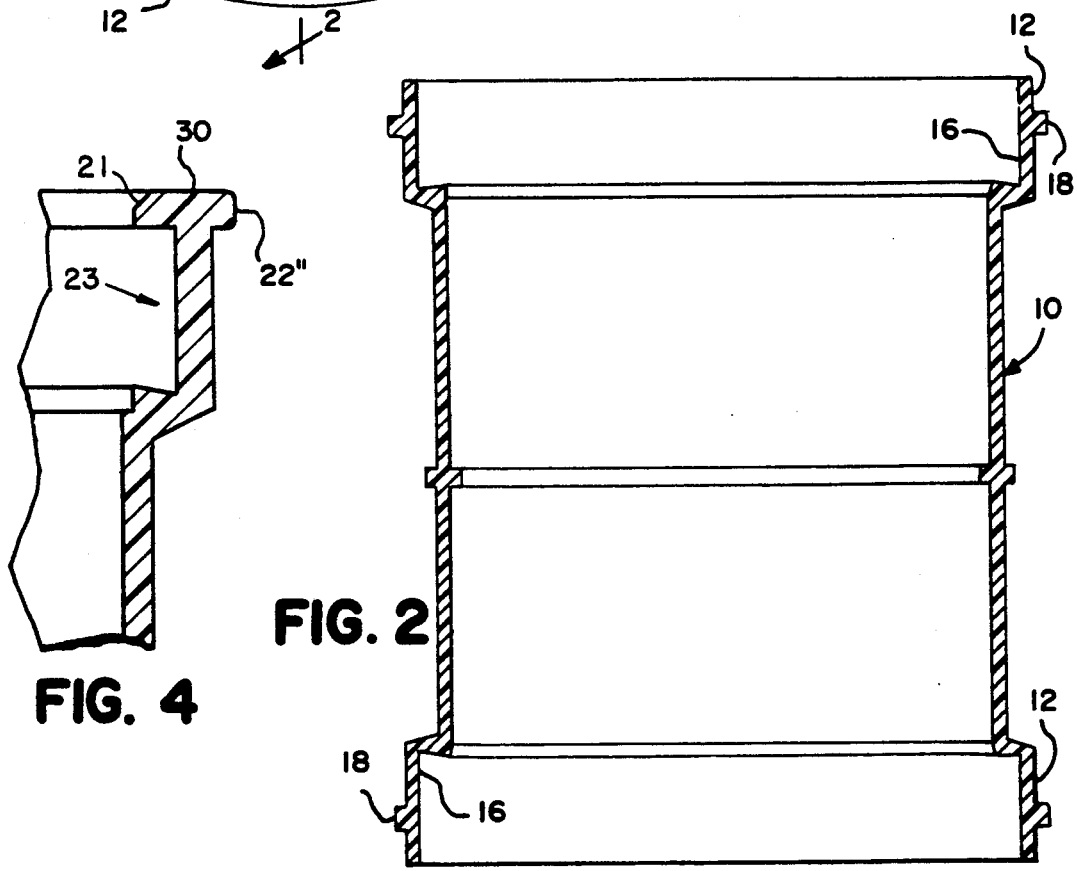
FIG. 2
FIG. 4

FITTING SOCKET WITH INTEGRAL REINFORCING RING

This is a continuation of application Ser. No. 268,223, fled Nov. 7, 1988 (now abandoned).

BACKGROUND OF THE INVENTION

1. Field of the Invention

The present invention relates generally to the field of pipe and fitting connections, and more particularly, is directed to an improved bell and spigot joint including an integral, exterior, reinforcing ring for strengthening the bell.

2. Discussion of the Prior Art

It is presently the usual practice to extrude plastic pipes in elongate, cylindrical configuration of a desired diameter and wall thickness and then to cut the extruded product into individual lengths of convenient size suitable for handling, shipping and installing, for example, ten foot lengths or twenty foot lengths. Each length of pipe is enlarged or "belled" at one end sufficiently to join the next adjacent pipe section by receiving therewithin the unenlarged or "spigot" end of the adjacent length of pipe. The inside diameter of the bell is formed sufficiently large to receive the spigot end of the next section of pipe with sufficient clearance to allow the application of packing, caulking, gaskets or other devices which have been designed and used to prevent leakage at the pipe joints when a plurality of pipe lengths are joined to form a pipe line. Depending upon the intended pressure of the fluid being conveyed, and other design parameters, the seal within the joint between adjacent lengths of pipe will be required to be more or less sophisticated.

Similarly, fittings have been fabricated for compatible use within the piping systems to accommodate various design characteristics, such as ells, wyes, tees and the like. Such fittings have been designed with one or more bells or sockets at the fitting extremities, depending upon the intended use and purpose of each fitting.

Prior workers in the art have found that the weakest part of the piping system is usually the bell or socket portion, either in a length of pipe or in a fitting. Frequently, when a pipe joint is being made up in the field, the parts are not precisely positioned in axial alignment by the workers, thereby placing additional stress upon the bell as the spigot of the part to be connected is inserted. In other instances, the spigot end of the pipe to be joined together with the associated packing or sealing materials may be too large for the bell or socket, thereby also placing large stresses on the bell or socket. In extreme conditions, the misalignment or oversize of the parts can result in the splitting of the bell, thereby requiring immediate repair or replacement of the part in order to maintain the integrity of the system. Sometimes, the damage to the bell is not noticed at the time of installation and the damaged part is covered and hidden from view. Under such circumstances, the costs of repair will be greatly increased due to the extra time and equipment required to first locate the damage and then to excavate to expose the faulty part.

SUMMARY OF INVENTION

The invention relates generally to a novel configuration of a pipe bell or socket construction, and more particularly, is directed to an improved pipe bell design including an integral, exterior reinforcing ring.

In accordance with the present invention, each length of plastic pipe or each plastic fitting is provided in known manner at one end with a hub or socket construction of design suitable to receive therein the spigot end of a connecting length of plastic pipe in a manner to provide both a sturdy joint construction and a leakproof interconnection between the joined members. Preferably, the bell or hub construction may be inwardly formed in known manner to receive and retain therein a resilient gasket of construction well known to those skilled in the art and suitable to seal the interconnection between the bell and spigot components of the joint.

In accordance with the teachings of the present invention, the exterior periphery of the hub or socket construction is outwardly provided with an integral, radially outwardly projecting reinforcing ring to provide a hub construction of greatly increased strength. The added reinforcing ring material provides additional resistance against splitting both when the parts are assembled and after the piping system has been placed in use. The reinforcing ring is integrally added to the plastic pipe fitting or to the length of pipe when the pipe or fitting bell or socket is formed. The cost of the additional plastic material required to form the reinforcing ring is substantially negligible and adds very little to the total cost of the hub or spigot construction. Typically, the usual pipe bell or fitting socket is formed by first heating the end of the pipe or fitting and then employing a suitable shaped mandrel or mold to form the exact desired configuration as designed for the intended purpose. By altering an existing mandrel or mold design as necessary to form the external, integral reinforcing ring, the reinforcing ring can be simultaneously integrally formed when the pipe bell or hub or fitting socket is formed.

As above set forth, the reinforcing ring of the present invention is integrally formed on the exterior periphery of the hub or socket and may be longitudinally positioned either at the outer end of the hub or socket or may be spaced inwardly from the hub or socket end, depending upon the design parameters and conditions of use. In each instance, however, by integrally forming the reinforcing ring exteriorly of the hub or socket, considerable additional strength will be added to the bell or socket construction in a manner to resist splitting. This in turn adds additional strength and integrity to the system without any significant increase in the cost of the piping system components.

As employed herein, the terms "pipe" and "fitting" are defined as equivalent components of a piping system for purposes of this application. Accordingly, terms such as "hub", "bell", "socket" and "spigot" as herein used are intended to define similar constructions and to be equally applicable and interchangeable with both pipe sections and with fittings.

It is therefore an object of the present invention to provide an improved reinforcing ring for pipe and fitting bells and sockets of the type set forth.

It is another object of the present invention to provide a novel hub or socket design featuring an integral, external reinforcing ring suitable to dramatically increase the strength of the hub or socket construction.

It is another object of the present invention to provide a novel pipe bell with reinforcing ring wherein an external, integral reinforcing ring can be added to a hub or socket construction with little increase in material cost in a manner to significantly increase the resistance of the bell or socket to splitting, both when the joint between adjacent parts of a piping system is made up and after periods of use.

It is another object of the present invention to provide a novel pipe bell with reinforcing ring that is simple in construction, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view of a plastic pipe fitting, such as a repair coupling, showing the reinforcing ring of the present invention exteriorly applied at both socket constructions.

FIG. 2 is an enlarged, cross-sectional view taken along line 2—2 on FIG. 1, looking in the direction of the arrows.

FIG. 3 is an enlarged, partial, cross-sectional view showing a reinforcing ring applied to a first type of socket construction.

FIG. 4 is a partial, cross-sectional view similar to FIG. 3 showing the reinforcing ring endwardly applied on the fitting socket.

DESCRIPTION OF THE PREFERRED EMBODIMENT OF THE INVENTION

Figure 5:
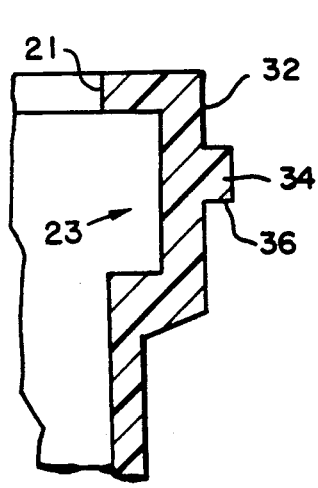
FIG. 5 is a partial, cross-sectional view showing a rectangular, square edge configured reinforcing ring exteriorly medially applied on a fitting socket.

Although specific terms are used in the following description for the sake of clarity, these terms are intended to refer only to the particular structure of the invention selected for illustration in the drawings, and are not intended to define or limit the scope of the invention.

Referring now to the drawings, in FIGS. 1 and 2, a plastic pipe fitting 10 comprising plastic composition of type well known to those skilled in the art is illustrated. The fitting shown is commonly referred to in the fitting industry as a repair coupling and is set forth for purposes of illustration only and should not be considered as limiting the scope of the invention to any particular style of fitting or to any specific size or material. The reinforcing ring of the present invention is equally applicable to the bells or sockets of all types of plastic and other material pipe fittings and pipe bells.

As shown, the fitting 10 comprises a pair of similar, opposed sockets or bells 12 which are formed of the diameter larger than the fitting body 14 in known manner to facilitate interconnecting the various parts of a piping system (not shown) in known manner. Each socket or bell 12 is internally configured to provide an enlarged pocket 16 which can be configured suitably in known manner to receive and retain a resilient sealing gasket (not shown) therewithin in manner well known to those skilled in the art. The interior configuration of the pocket 16 can be varied to any desired configuration to receive and seat therewithin a resilient gasket (not shown) or other sealing material of any known configuration for pipe sealing purposes in manner well known to those skilled in the art. The interior pocket configuration forms no part of the present invention and accordingly, the pocket configurations shown are for purposes of illustration only, and should not be considered as limiting the application of the integral, reinforcing ring to any particular pocket designs.

Still referring to FIGS. 1 and 2, it will be seen that a reinforcing ring 18 has been integrally molded or otherwise formed exteriorly of each socket 12 in a manner to provide a ring of increased strength to thereby render the socket 12 more resistant to splitting or otherwise breaking upon the application of a spigot end of the member to be joined that may be slightly too large for the fitting or perhaps upon the application of the spigot end of the joining member in a direction angularly offset from the axis of the fitting 10. By forming the reinforcing ring 18 at the time of manufacture of the fitting 10 itself, the reinforcing ring 18 can be applied in a manner to be completely integral with the fitting socket and with little, if any, increase in the cost of fabrication. It is noteworthy that the reinforcing ring 18 considerably increases the strength of the socket construction 12 without requiring the entire socket wall to be increased in thickness, thereby resulting in significant material saving costs.

As shown in FIGS. 3-15, a lip 21, integrally formed with the socket 20, can extend radially inwardly from the front end terminus of the socket 20 to define a gasket pocket 23 with the inner cylindrical periphery of the socket 20.

Referring now to FIG. 3, there is shown an enlarged, partial, cross-sectional view of another embodiment 10' fitting comprising a socket 20 which may be similar in configuration to the socket construction and gasket pocket configuration illustrated in U.S. Pat. No. 4,343,480, which patent is owned by the assignee of the present application. As above set forth, however, it will be appreciated that many prior pocket configurations have been designed by prior workers in the art, and that the present invention is equally applicable to all such prior designs. As shown, a reinforcing ring 22 of generally rectangular cross-sectional configuration with rounded corners 24 is integrally molded or otherwise formed with the socket sidewall 26 and extends outwardly from the outer periphery 28 thereof. In this manner, the added strength of the reinforcing ring 28 can be easily and inexpensively applied to the socket 20 in a manner not to interfere in any respect with the function and operation of the fitting 10'. As illustrated, the cross sectional thickness of the reinforcing ring 22 is approximately equal to the thickness of the socket sidewall 26. It will be appreciated however, that the cross sectional thickness of the reinforcing ring 22 could be less than the thickness of the socket sidewall 26 or more than the thickness of the socket sidewall and still fall within the intent and scope of the present invention.

It is contemplated that the reinforcing ring 22 could be applied in any desired position along the outer periphery 28 of the socket sidewall 26, as best suits the particular application and particular design of a fitting. For example, as illustrated in FIG. 4, a modified reinforcing ring 22" can be integrally molded or otherwise formed at the fitting socket outer end 30 to thereby reinforce the fitting socket at the point of entrance of the spigot of the next adjacent length of pipe (not shown). The reinforcing ring could also be formed at the fitting socket base end, or anywhere along the outer periphery of the socket, as best suited for individual design considerations.

FIG. 5 illustrates a fitting socket 32 having a medially positioned, radially outwardly projecting reinforcing ring 34. The reinforcing ring 34 is formed integrally with the socket body and is generally rectangular in cross-sectional configuration with square edges 36.

Figure 6:
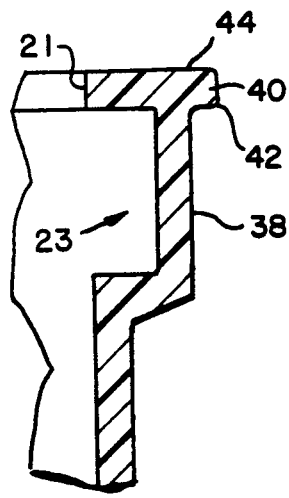
FIG. 6 is a partial, cross-sectional view similar to FIG. 5 showing a rectangular, rounded edge reinforcing ring endwardly applied on the fitting socket.

In FIG. 6, there is illustrated a portion of a conceptual fitting socket 38 with an outer reinforcing ring molded integrally therewith and positioned at the entrance or outer end 44 thereof. The reinforcing ring 40 is integrally formed with the socket construction and is shown to be generally rectangular in cross-sectional configuration having generally rounded outer edges 42.

Figure 7:
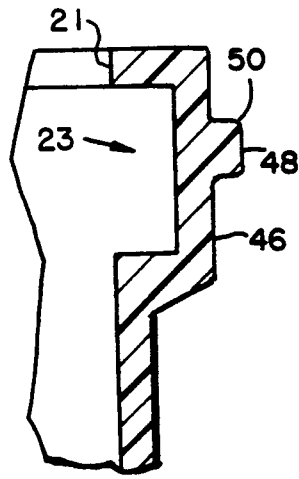
FIG. 7 is a partial, cross-sectional view similar to FIG. 5 showing a rectangular reinforcing ring with rounded edges, integrally medially applied on a fitting socket.

In FIG. 7, a portion of a fitting socket 46 is illustrated which is similar in concept to that illustrated in FIG. 5 and includes a medially positioned, integral, radially outwardly extending, reinforcing ring 48. As shown, in this embodiment, the reinforcing ring 48 is provided with rounded edges 50. As above set forth, it is within the scope and intent of this invention to position the reinforcing ring 48 either medially as shown, or perhaps closer to the forward end of the socket 46 or closer to the rearward end of the socket.

Figure 8:
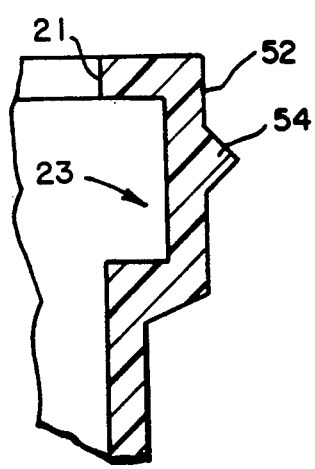
FIG. 8 is a partial, cross-sectional view similar to FIG. 5 showing a reinforcing ring of triangular cross-sectional configuration medially applied on a fitting socket.

Referring now to FIG. 8, as illustrated a modified embodiment of a fitting socket 52 is integrally formed with a reinforcing ring 54 for socket strengthening purposes. In the manner shown, the reinforcing ring 54 is preferably fabricated of generally triangular cross-sectional configuration to thereby provide a reinforcing member of entirely different appearance and construction. The reinforcing ring 54 is generally medially positioned about the outer periphery of the socket 52 and extends radially outwardly from the socket outer periphery.

Figure 9:
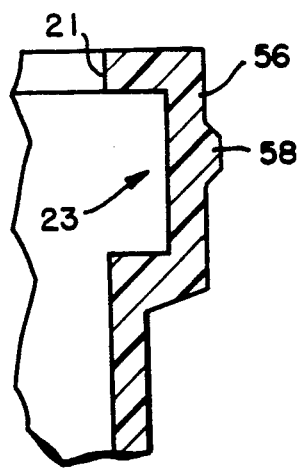
FIG. 9 is a partial, cross-sectional view similar to FIG. 5 showing a reinforcing ring of trapezoidal cross-sectional configuration medially applied on a fitting socket.

In FIG. 9, a modified socket construction 56 is illustrated with an integral, medially positioned, radially outwardly extending reinforcing ring 58. In this embodiment, the reinforcing ring has been fabricated to a generally trapezoidal cross-sectional configuration to aid in strengthening and reinforcing the socket construction. Again, it is within the intent and scope of the invention to position the reinforcing ring 58 either rearwardly of or forwardly of the illustrated location on the outer periphery of the socket 56.

Figure 10:
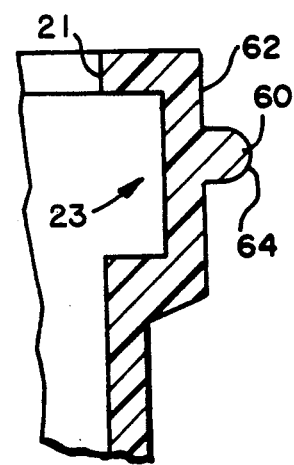
FIG. 10 is a partial, cross-sectional view similar to FIG. 5 showing a reinforcing ring of obround cross-section configuration medially applied on a fitting socket.

As shown in FIG. 10, a modified fitting socket 62 is illustrated in partial cross-section having a medially positioned, outwardly projecting, integral reinforcing ring 60 for socket strengthening purposes. As illustrated, the reinforcing ring 60 is preferably fabricated to an obround cross-sectional configuration having a rounded outer surface 64.

Figure 11:
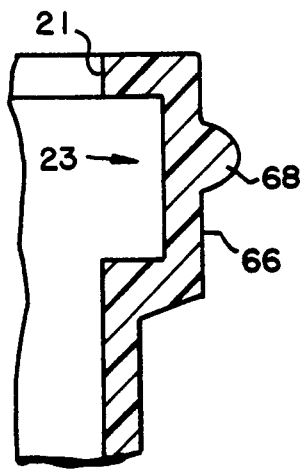
FIG. 11 is a partial, cross-sectional view similar to FIG. 5 showing an integral reinforcing ring of semi-circular cross-sectional configuration medially applied on a fitting socket.

FIG. 11 shows a fitting socket construction 66 having a medially positioned, integral, semi-circular cross-sectional configuration reinforcing ring 68.

Figure 12:
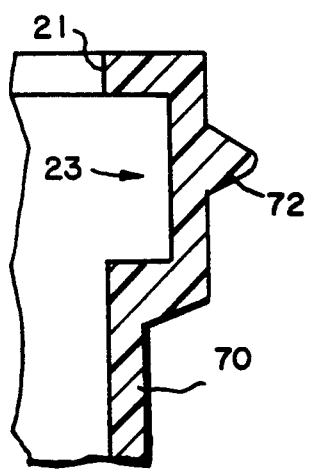
FIG. 12 is a partial, cross-sectional view similar to FIG. 5 showing a reinforcing ring of semi-elliptical cross-sectional configuration medially applied on a fitting socket.

FIG. 12 shows a modified fitting socket 70 comprising a radially outwardly extending, medially positioned, integral, reinforcing ring 72 of semi-elliptical cross-sectional configuration.

Figure 13:
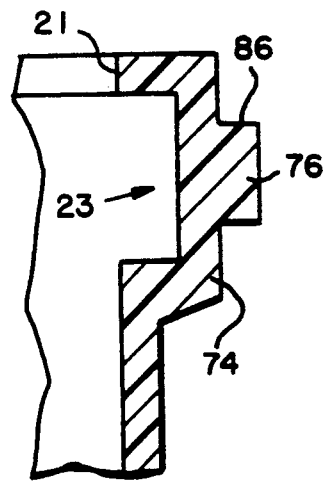
FIG. 13 is a partial, cross-sectional view similar to FIG. 5 showing a reinforcing ring of rectangular configuration applied to a fitting socket, with the long sides of the rectangular ring positioned parallel to the longitudinal axis of the fitting.

FIG. 13 shows a modified fitting socket 74 having a medial, radially outwardly extending, reinforcing ring 76 of generally rectangular cross-sectional configuration. In the embodiment of FIG. 13 the short sides 86 of the reinforcing ring 76 are positioned at right angles to the outer periphery of the socket body and at right angles to the longitudinal axis of the socket 74.

Figure 14:
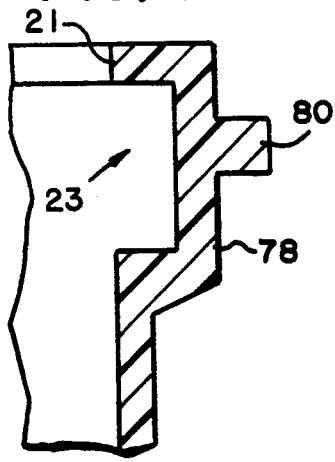
FIG. 14 is a partial, cross-sectional view similar to FIG. 5 showing a reinforcing ring of square cross-sectional configuration exteriorly applied to a fitting socket.
Figure 15:
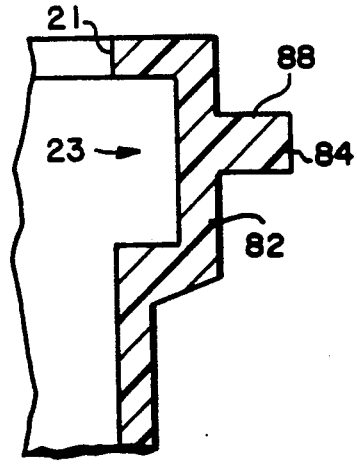
FIG. 15 is a partial, cross-sectional view similar to FIG. 5 showing a reinforcing ring of rectangular cross sectional configuration medially applied to a fitting socket, with the short sides of the rectangular reinforcing ring positioned parallel to the longitudinal axis of the fitting.

In FIG. 14, a modified fitting socket 78 is illustrated with a medially positioned, radially outwardly extending reinforcing ring 80 integrally formed therewith. The reinforcing ring 80 is illustrated as being fabricated of generally square cross-sectional configuration. In FIG. 15 a modified fitting socket 82 is shown comprising a radially outwardly extending, integral, reinforcing ring 84. In this embodiment, the reinforcing ring 84 is illustrated as being fabricated to a generally rectangular cross-sectional configuration with the long sides 88 of the rectangle extending at right angles from the outer periphery of the socket body and at right angles to the longitudinal axis of the fitting socket 82.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A socket construction for a fitting having a body of a first, smaller diameter and a forward end, the socket construction comprising:

an enlarged, cylindrical socket of a second, larger diameter, said socket being integrally formed of a same material of the fitting and being defined by a cylindrical sidewall, the sidewall having an inner cylindrical periphery and an outer cylindrical periphery, the outer cylindrical periphery of the socket being of uniform diameter, said sidewall terminating forwardly at the forward end of the fitting in a sidewall front end terminus for receiving a spigot end of an adjoining member, a rear end terminus of said socket being spaced rearwardly from the front end terminus, a lip, integral with said socket, extending radially inwardly from said front end terminus to define a gasket pocket with said inner cylindrical periphery; and an inelastic, integral, non-helical, closed reinforcing ring extending radially outwardly from the outer periphery of the socket sidewall for increasing the resistance of the sidewall to fracture upon insertion of the spigot end, said reinforcing ring having an outer periphery that is greater than the outer periphery of the socket sidewall, said reinforcing ring being spaced forwardly from the sidewall rear end terminus.

2. The socket construction of claim 1 wherein the reinforcing ring is positioned substantially equidistant between the sidewall front end terminus and the sidewall rear end terminus.

3. The socket construction of claim 2 wherein the reinforcing ring is generally rectangular in cross-sectional configuration.

4. The socket construction of claim 3 wherein the reinforcing ring comprises outer, square edges.

5. The socket construction of claim 2 wherein the reinforcing ring is generally triangular in cross-sectional configuration.

6. The socket construction of claim 2 wherein the reinforcing ring is generally triangular in cross-sectional configuration.

7. The socket construction of claim 2 wherein the reinforcing ring is generally obround in cross-sectional configuration.

8. The socket construction of claim 2 wherein the reinforcing ring is generally semi-circular in cross-sectional configuration.

9. The socket construction of claim 2 wherein the reinforcing ring is generally semi-elliptical in cross-sectional configuration.

10. The socket construction of claim 2 wherein the reinforcing ring is generally square in cross-sectional configuration.

11. The socket construction of claim 2 wherein the reinforcing ring is generally rectangular in configuration, the rectangular configuration comprising a pair of spaced long sides and a pair of spaced short sides and wherein the long sides extend at right angles from the outer periphery of the socket sidewall.

12. The socket construction of claim 2 wherein the reinforcing ring is generally rectangular in configuration, the rectangular configuration comprising a pair of spaced long sides and a pair of spaced short sides and wherein the short sides extend at right angles from the outer periphery of the socket sidewall.

13. A socket construction for a fitting having a body of a first smaller diameter and a forward end, the socket construction comprising:

an enlarged, cylindrical socket of a second, larger diameter, said socket being defined by a cylindrical sidewall, the sidewall having an inner cylindrical periphery and an outer cylindrical periphery, the outer cylindrical periphery of the socket being of substantially uniform diameter, said sidewall terminating forwardly at the forward end of the fitting in a sidewall front end terminus for receiving a spigot end of an adjoining member, a rear end terminus of said socket being spaced rearwardly from the front end terminus, a lip, integral with said socket, extending radially inwardly from said front end terminus to define a gasket pocket with said inner cylindrical periphery; and an inelastic, integral, non-helical, closed reinforcing ring extending radially outwardly from the periphery of the socket sidewall for increasing the resistance of the sidewall to fracture upon insertion of the spigot end, said reinforcing ring having an outer periphery that is greater than the outer periphery of the socket sidewall, said reinforcing ring being spaced forwardly from the sidewall rear end terminus.

* * * * *